(12) United States Patent
Lee (10) Patent No.: US 11,265,487 B2
(45) Date of Patent: Mar. 1, 2022

(54) CAMERA VIEW SYNTHESIS ON HEAD-MOUNTED DISPLAY FOR VIRTUAL REALITY AND AUGMENTED REALITY

(71) Applicant: Media Tek Inc., Hsinchu (TW)

(72) Inventor: Yuan-Chung Lee, Hsinchu (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 16/431,950

(22) Filed: Jun. 5, 2019

(65) Prior Publication Data
US 2020/0389605 A1 Dec. 10, 2020

(51) Int. Cl.
| H04N 5/265 | (2006.01) |
| H04N 5/247 | (2006.01) |
| G06T 7/55 | (2017.01) |
| H04N 7/01 | (2006.01) |

(52) U.S. Cl.
CPC .............. *H04N 5/265* (2013.01); *G06T 7/55* (2017.01); *H04N 5/247* (2013.01); *H04N 7/0117* (2013.01); *H04N 7/0127* (2013.01)

(58) Field of Classification Search
CPC ............ G02B 27/017; G02B 2027/014; G02B 2027/0187; G02B 2027/0138; G02B 27/0172; G02B 27/01; G02B 2027/0134; G02B 2027/0132; G02B 2027/0123; G02B 2027/0147; G02B 27/0179; G06F 3/011; G06F 3/012; G06F 3/013; G06T 19/006; G06T 7/55; H04N 13/344; H04N 13/332; H04N 13/383; H04N 13/239; H04N 13/156; H04N 13/117; H04N 5/265; H04N 7/0127; H04N 7/0117; H04N 5/247; H04N 2201/3245; G06K 9/00671; G05B 2219/39449
See application file for complete search history.

(56) References Cited

U.S. PATENT DOCUMENTS

| | | | |
|---|---|---|---|
| 9,063,330 B2 * | 6/2015 | LaValle | G02B 27/0093 |
| 9,214,040 B2 | 12/2015 | Smolic et al. | |
| 9,489,044 B2 * | 11/2016 | Fateh | G06F 3/045 |
| 9,618,746 B2 * | 4/2017 | Browne | G02B 27/017 |
| 9,798,381 B2 * | 10/2017 | Schlachta | A61B 1/00039 |
| 9,804,669 B2 * | 10/2017 | Fateh | G02B 27/0172 |
| 9,898,075 B2 * | 2/2018 | Fateh | G02B 27/646 |
| 10,175,483 B2 * | 1/2019 | Salter | G06T 11/60 |
| 10,649,211 B2 * | 5/2020 | Miller | G06F 3/011 |
| 10,901,225 B1 * | 1/2021 | De Nardi | G02B 27/0093 |
| 10,965,929 B1 * | 3/2021 | Bellows | G02B 27/017 |
| 2007/0236514 A1 * | 10/2007 | Agusanto | G16H 50/50 345/646 |
| 2008/0278821 A1 * | 11/2008 | Rieger | G02B 27/017 359/630 |

(Continued)

*Primary Examiner* — Chiawei Chen
(74) *Attorney, Agent, or Firm* — Wolf, Greenfield & Sacks, P.C.

(57) ABSTRACT

Various examples pertaining to camera view synthesis on head-mounted display (HMD) for virtual reality (VR) and augmented reality (AR) are described. A method involves receiving, from a plurality of tracking cameras disposed around a HMD, image data of a scene which is on a first side of the HMD. The method also involves performing, using the image data and depth information pertaining to the scene, view synthesis to generate a see-through effect of viewing the scene from a viewing position on a second side of the HMD opposite the first side thereof.

18 Claims, 8 Drawing Sheets

(56) References Cited

U.S. PATENT DOCUMENTS

| | | | | |
|---|---|---|---|---|
| 2012/0212499 | A1* | 8/2012 | Haddick | G02B 27/0093 345/589 |
| 2013/0050070 | A1* | 2/2013 | Lewis | G06K 9/00604 345/156 |
| 2014/0118631 | A1* | 5/2014 | Cho | H04N 21/43637 348/836 |
| 2015/0185479 | A1* | 7/2015 | Wang | G02B 27/017 348/115 |
| 2015/0317956 | A1* | 11/2015 | Lection | G09G 5/363 345/633 |
| 2015/0324650 | A1* | 11/2015 | Langenberg | B60R 1/025 348/148 |
| 2015/0348327 | A1* | 12/2015 | Zalewski | G06F 3/01 345/419 |
| 2015/0356737 | A1* | 12/2015 | Ellsworth | H04N 5/247 348/169 |
| 2016/0044276 | A1* | 2/2016 | Shearman | A42B 3/0426 348/207.1 |
| 2016/0091720 | A1* | 3/2016 | Stafford | G02B 27/0093 345/8 |
| 2016/0110615 | A1* | 4/2016 | Weller | B60R 1/00 348/115 |
| 2016/0116979 | A1* | 4/2016 | Border | G06F 3/013 345/156 |
| 2016/0133170 | A1* | 5/2016 | Fateh | G06F 3/04842 345/428 |
| 2016/0147304 | A1* | 5/2016 | Lund | G06F 3/011 715/702 |
| 2016/0240008 | A1* | 8/2016 | Haddick | G06T 11/001 |
| 2016/0306431 | A1* | 10/2016 | Stafford | G02B 27/0172 |
| 2016/0350975 | A1* | 12/2016 | Nakagawa | G06T 7/337 |
| 2017/0032195 | A1* | 2/2017 | Gondo | G02B 27/017 |
| 2017/0061693 | A1* | 3/2017 | Kohler | G06T 19/006 |
| 2018/0067316 | A1* | 3/2018 | Lee | G02B 27/0172 |
| 2018/0096519 | A1* | 4/2018 | Tokubo | G06F 3/011 |
| 2018/0097975 | A1* | 4/2018 | Osman | B25J 9/1697 |
| 2018/0114353 | A1* | 4/2018 | Champion | G06T 19/006 |
| 2018/0122143 | A1* | 5/2018 | Ellwood, Jr. | G02B 27/0172 |
| 2018/0181196 | A1* | 6/2018 | Lee | H04N 5/23296 |
| 2018/0197415 | A1* | 7/2018 | Kurata | G08G 1/166 |
| 2018/0249119 | A1* | 8/2018 | Guenter | G06T 11/60 |
| 2018/0293041 | A1* | 10/2018 | Harviainen | G02B 27/017 |
| 2019/0011703 | A1* | 1/2019 | Robaina | G06F 3/017 |
| 2019/0101758 | A1* | 4/2019 | Zhu | G02B 27/0093 |
| 2019/0331919 | A1* | 10/2019 | Huo | G02B 27/0172 |
| 2019/0333109 | A1* | 10/2019 | Teller | G06Q 30/0267 |
| 2019/0349573 | A1* | 11/2019 | Pitts | H04N 13/111 |
| 2019/0361518 | A1* | 11/2019 | Vakrat | A63F 13/213 |
| 2019/0387168 | A1* | 12/2019 | Smith | G06F 3/0304 |
| 2020/0285056 | A1* | 9/2020 | Linde | G02B 27/0176 |
| 2020/0286289 | A1* | 9/2020 | Mitchell | G02B 27/0172 |
| 2021/0088790 | A1* | 3/2021 | Forster | G02B 27/017 |

\* cited by examiner

CAMERA VIEW SYNTHESIS ON HEAD-MOUNTED DISPLAY FOR VIRTUAL REALITY AND AUGMENTED REALITY

TECHNICAL FIELD

The present disclosure is generally related to computer-based interactive experience and, more particularly, to camera view synthesis on head-mounted display (HMD) for virtual reality (VR) and augmented reality (AR).

BACKGROUND

Unless otherwise indicated herein, approaches described in this section are not prior art to the claims listed below and are not admitted as prior art by inclusion in this section.

In VR and AR applications, a HMD is typically worn by a user for interactive experience in a computer-simulated environment (for VR) or a real-world environment (for AR). When the HMD is worn on the head of the user, a head-mount piece of the HMD is usually worn in front of the eyes of the user with a display device disposed in front of the eyes of the user to display visual effects for VR/AR. Accordingly, a scene in front of the user is obstructed from a direct view by the user since a portion of the HMD is worn in front of the eyes of the user.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

One objective of the present disclosure is to provide solutions, schemes, concepts and designs that reduce cost of manufacturing of a HMD by reducing the number of cameras on the HMD. Another objective of the present disclosure is to provide solutions, schemes, concepts and designs that provide a simple/rough see-through function for the HMD without actually using any see-through camera on the HMD.

In one aspect, a method may involve receiving, from a plurality of tracking cameras disposed around a HMD, image data of a scene which is on a first side of the HMD. The method may also involve performing, using the image data and depth information pertaining to the scene, view synthesis to generate a see-through effect of viewing the scene from a viewing position on a second side of the HMD opposite the first side thereof.

In one aspect, an apparatus may include a HMD and a processor. The HMD may include a head-mount piece wearable by a user on a head of the user. The HMD may also include a plurality of tracking cameras disposed around the head-mount piece. During operation, the processor may receive, from the plurality of tracking cameras, image data of a scene which is on a first side of the HMD. Moreover, the processor may perform, using the image data and depth information pertaining to the scene, view synthesis to generate a see-through effect of viewing the scene from a viewing position on a second side of the HMD opposite the first side thereof.

It is noteworthy that, although description provided herein may be in the context of certain interactive experience technologies such as depth image-based rendering (DIBR) and hole filling, the proposed concepts, schemes and any variation(s)/derivative(s) thereof may be implemented by and/or with other interactive experience topologies and/or computer vision technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Under various solutions, schemes, concepts and designs in accordance with the present disclosure, two or more side or tracking cameras mounted or otherwise disposed around a HMD may be utilized to create a viewing effect of one or more frontal see-through cameras. For instance, through view synthesis on image data from the side or tracking cameras, stereo images similar to those that would be generated by multiple frontal see-through cameras may be obtained. Alternatively, through view synthesis on image data from the side or tracking cameras, non-stereo images similar to those that would be generated by a single frontal see-through camera may be obtained.

Figure 1:
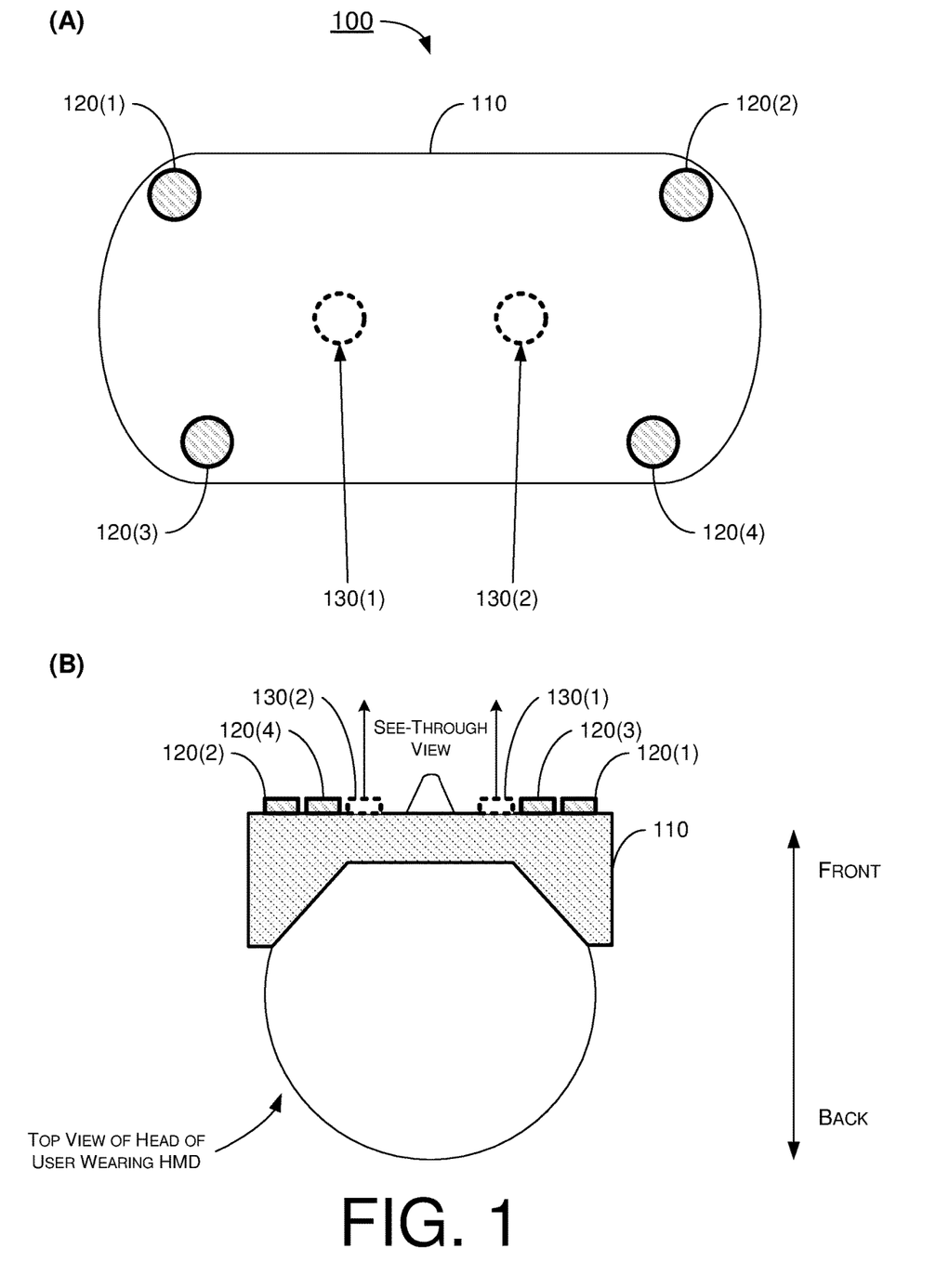
FIG. 1 is a diagram of an example design in accordance with an implementation of the present disclosure.

FIG. 1 illustrates an example design 100 in accordance with an implementation of the present disclosure. Part (A) of FIG. 1 shows a frontal view of design 100 and part (B) of FIG. 1 shows a top view of design 100. In design 100, a head-mount piece 110 may have a plurality of side or tracking cameras 120(1)~120(4) mounted or otherwise disposed around a profile of head-mount piece 110. The side or tracking cameras 120(1)~120(4) may include a wide-view camera, a fisheye camera, a depth sensor, or a combination thereof. In any case, in design 100 none of the side or tracking cameras 120(1)~120(4) may be a see-through camera. In design 100, image data from side or tracking cameras 120(1)~120(4), as well as depth signals of depth information derived from the image data, may be utilized to generate a see-through view that would be generated by two non-existent (or virtual) frontal see-through cameras, represented by see-through cameras 130(1) and 130(2) in FIG. 1. It is noteworthy that, although a number of four side or tracking cameras are shown in design 100, in various implementations of design 100 a different number of side or tracking cameras (e.g., two or more) may be utilized.

Figure 2:
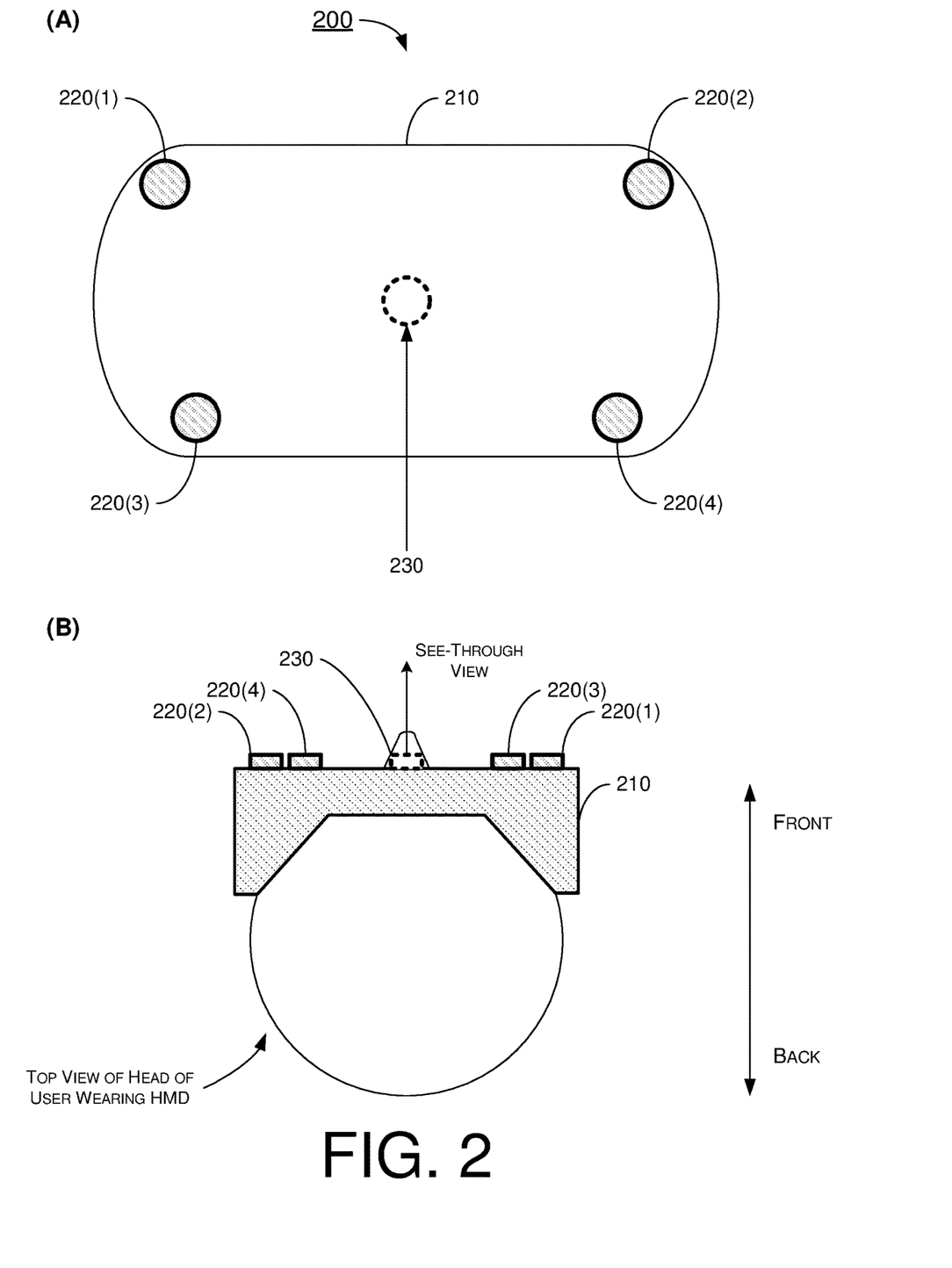
FIG. 2 is a diagram of an example design in accordance with an implementation of the present disclosure.

FIG. 2 illustrates an example design 200 in accordance with an implementation of the present disclosure. Part (A) of FIG. 2 shows a frontal view of design 200 and part (B) of FIG. 2 shows a top view of design 200. In design 200, a head-mount piece 210 may have a plurality of side or tracking cameras 220(1)~220(4) mounted or otherwise disposed around a profile of head-mount piece 210. The side or tracking cameras 220(1)~220(4) may include a wide-view camera, a fisheye camera, a depth sensor, or a combination thereof. In any case, in design 200 none of the side or tracking cameras 220(1)~220(4) may be a see-through camera. In design 200, image data from side or tracking cameras 220(1)~220(4), as well as depth signals of depth information derived from the image data, may be utilized to generate a see-through view that would be generated by a single non-existent (or virtual) frontal see-through camera, represented by see-through camera 230 in FIG. 2. It is noteworthy that, although a number of four side or tracking cameras are shown in design 100, in various implementations of design 200 a different number of side or tracking cameras (e.g., two or more) may be utilized.

Figure 3:
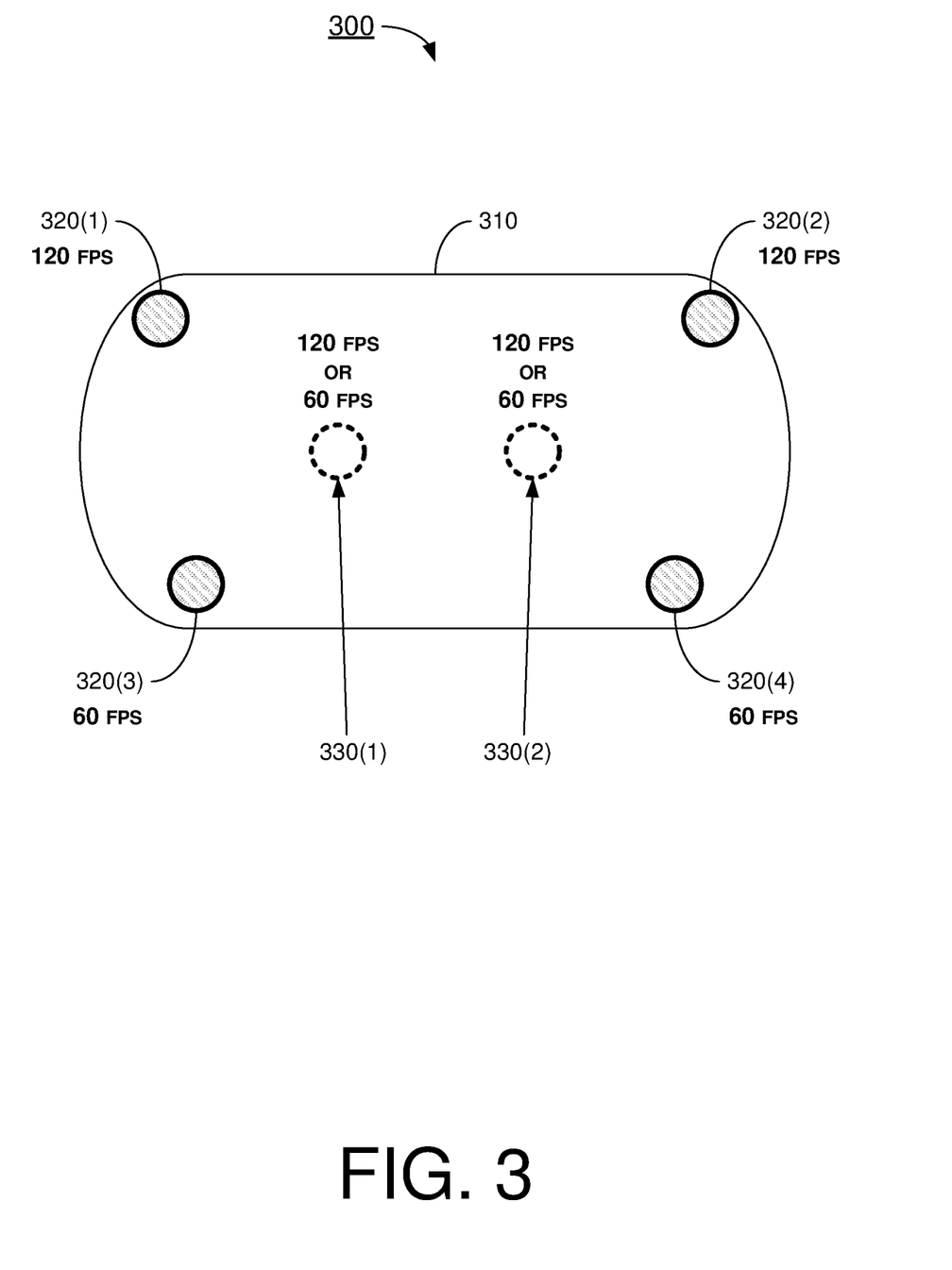
FIG. 3 is a diagram of an example design in accordance with an implementation of the present disclosure.

FIG. 3 illustrates an example design 300 in accordance with an implementation of the present disclosure. In design 300, a head-mount piece 310 may have a plurality of side or tracking cameras 320(1)~320(4) mounted or otherwise disposed around a profile of head-mount piece 310. The side or tracking cameras 320(1)~320(4) may include a wide-view camera, a fisheye camera, a depth sensor, or a combination thereof. In any case, in design 300 none of the side or tracking cameras 320(1)~320(4) may be a see-through camera. In design 300, image data from side or tracking cameras 320(1)~320(4), as well as depth signals of depth information derived from the image data, may be utilized to generate a see-through view that would be generated by two non-existent (or virtual) frontal see-through cameras, represented by see-through cameras 330(1) and 330(2) in FIG. 3. It is noteworthy that, although a number of four side or tracking cameras are shown in design 100, in various implementations of design 100 a different number of side or tracking cameras (e.g., two or more) may be utilized.

In design 300, each of the side or tracking cameras 320(1)~320(4) may have a respective frame rate (e.g., 120 frames per second (fps) or 60 fps). Accordingly, upon view synthesis, each of the see-through cameras 330(1) and 330(2) may have a respective frame rate (e.g., 120 fps or 60 fps). In the example shown in FIG. 3, both of the side or tracking cameras mounted or otherwise disposed near the top side of head-mount piece 310 may have a frame rate of 120 fps. Additionally, in the example shown in FIG. 3, both of the side or tracking cameras mounted or otherwise disposed near the bottom side of head-mount piece 310 may have a frame rate of 60 fps.

Figure 4:
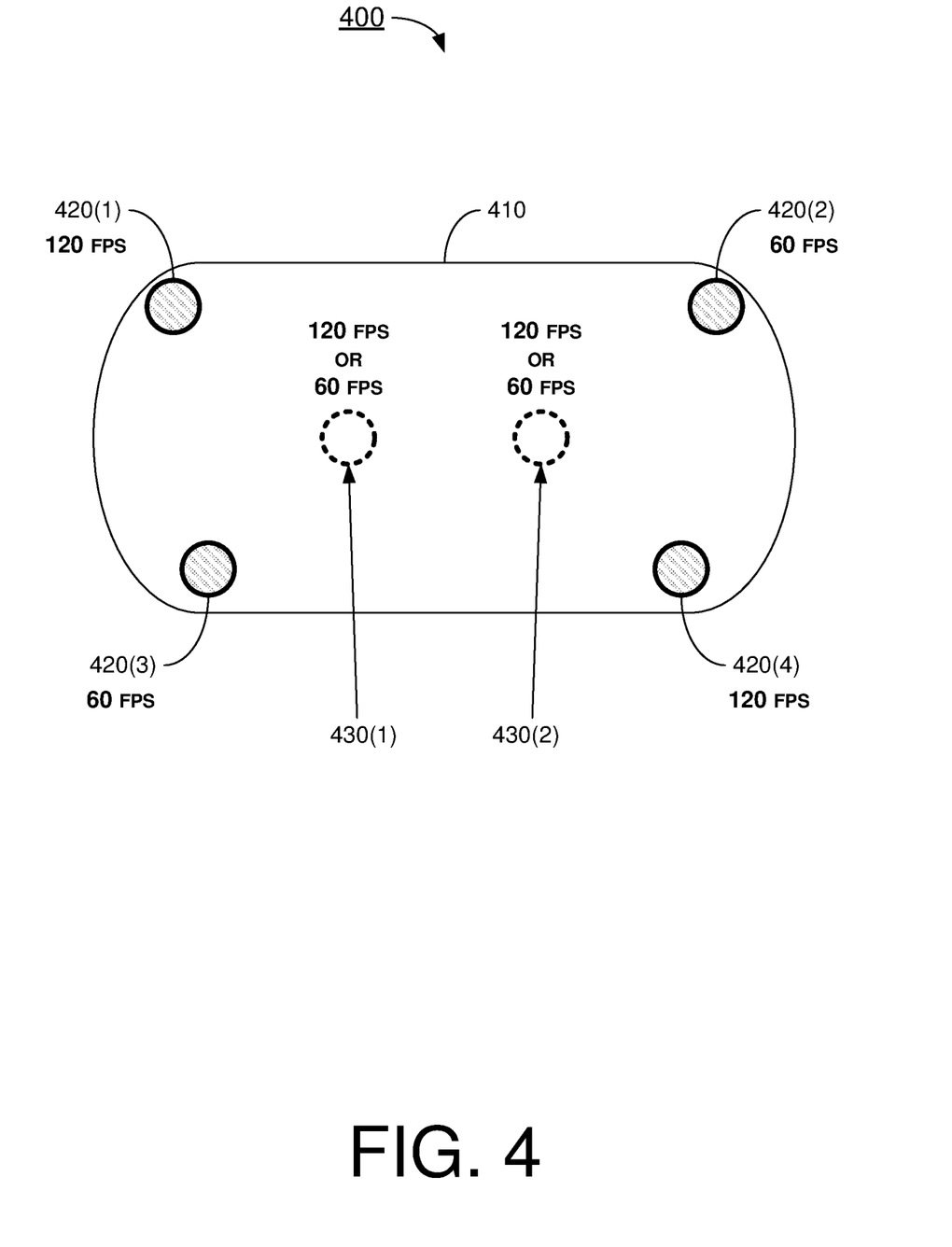
FIG. 4 is a diagram of an example design in accordance with an implementation of the present disclosure.

FIG. 4 illustrates an example design 400 in accordance with an implementation of the present disclosure. In design 400, a head-mount piece 410 may have a plurality of side or tracking cameras 420(1)~420(4) mounted or otherwise disposed around a profile of head-mount piece 410. The side or tracking cameras 420(1)~420(4) may include a wide-view camera, a fisheye camera, a depth sensor, or a combination thereof. In any case, in design 400 none of the side or tracking cameras 420(1)~420(4) may be a see-through camera. In design 400, image data from side or tracking cameras 420(1)~420(4), as well as depth signals of depth information derived from the image data, may be utilized to generate a see-through view that would be generated by two non-existent (or virtual) frontal see-through cameras, represented by see-through cameras 430(1) and 430(2) in FIG. 4. It is noteworthy that, although a number of four side or tracking cameras are shown in design 100, in various implementations of design 100 a different number of side or tracking cameras (e.g., two or more) may be utilized.

In design 400, each of the side or tracking cameras 420(1)~420(4) may have a respective frame rate (e.g., 120 fps or 60 fps). Accordingly, upon view synthesis, each of the see-through cameras 430(1) and 430(2) may have a respective frame rate (e.g., 120 fps or 60 fps). In the example shown in FIG. 4, one of the side or tracking cameras mounted or otherwise disposed near the top side of head-mount piece 410 may have a frame rate of 120 fps while the other side or tracking cameras mounted or otherwise disposed near the top side of head-mount piece 410 may have a frame rate of 60 fps. Similarly, in the example shown in FIG. 4, one of the side or tracking cameras mounted or otherwise disposed near the bottom side of head-mount piece 410 may have a frame rate of 120 fps while the other side or tracking cameras mounted or otherwise disposed near the bottom side of head-mount piece 410 may have a frame rate of 60 fps.

Figure 5:
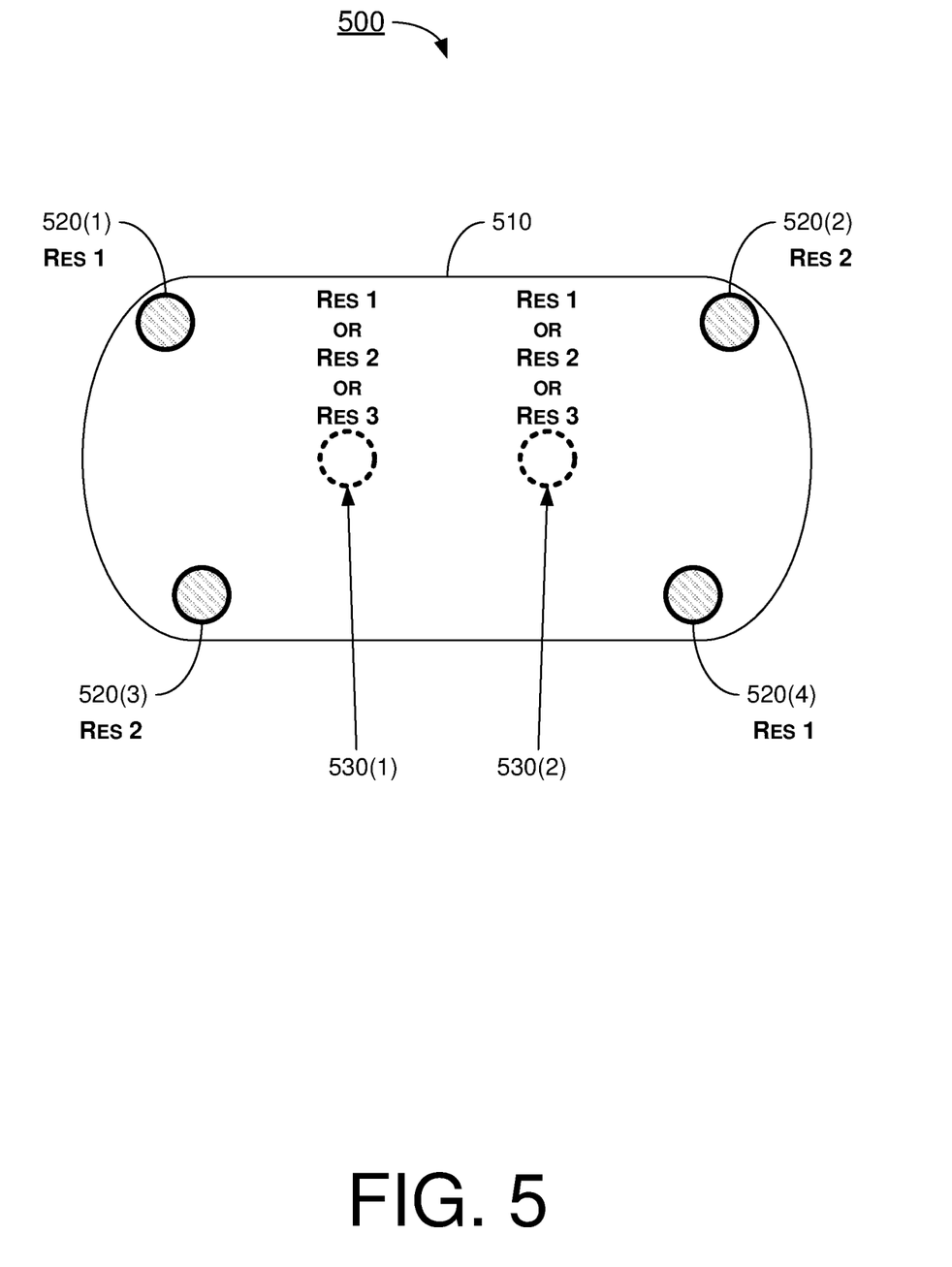
FIG. 5 is a diagram of an example design in accordance with an implementation of the present disclosure.

FIG. 5 illustrates an example design 500 in accordance with an implementation of the present disclosure. In design 500, a head-mount piece 510 may have a plurality of side or tracking cameras 520(1)~520(4) mounted or otherwise disposed around a profile of head-mount piece 510. The side or tracking cameras 520(1)~520(4) may include a wide-view camera, a fisheye camera, a depth sensor, or a combination thereof. In any case, in design 500 none of the side or tracking cameras 520(1)~520(4) may be a see-through camera. In design 500, image data from side or tracking cameras 520(1)~520(4), as well as depth signals of depth information derived from the image data, may be utilized to generate a see-through view that would be generated by two non-existent (or virtual) frontal see-through cameras, represented by see-through cameras 530(1) and 530(2) in FIG. 5. It is noteworthy that, although a number of four side or tracking cameras are shown in design 100, in various implementations of design 100 a different number of side or tracking cameras (e.g., two or more) may be utilized.

In design 500, each of the side or tracking cameras 520(1)~520(4) may have a respective resolution (e.g., first resolution or second resolution, denoted as "res 1" and "res 2" in FIG. 5, respectively). Accordingly, upon view synthesis, each of the see-through cameras 530(1) and 530(2) may have a respective resolution (e.g., first resolution, second resolution or third resolution, which is denoted as "res 3" in FIG. 5). In the example shown in FIG. 5, one of the side or tracking cameras mounted or otherwise disposed near the top side of head-mount piece 510 may have the first resolution while the other side or tracking cameras mounted or otherwise disposed near the top side of head-mount piece 510 may have the second resolution. Similarly, in the example shown in FIG. 5, one of the side or tracking cameras mounted or otherwise disposed near the bottom side of head-mount piece 510 may have the first resolution while the other side or tracking cameras mounted or otherwise disposed near the bottom side of head-mount piece 510 may have the second resolution. The first resolution, second resolution and third resolution may be different from each other.

Figure 6:
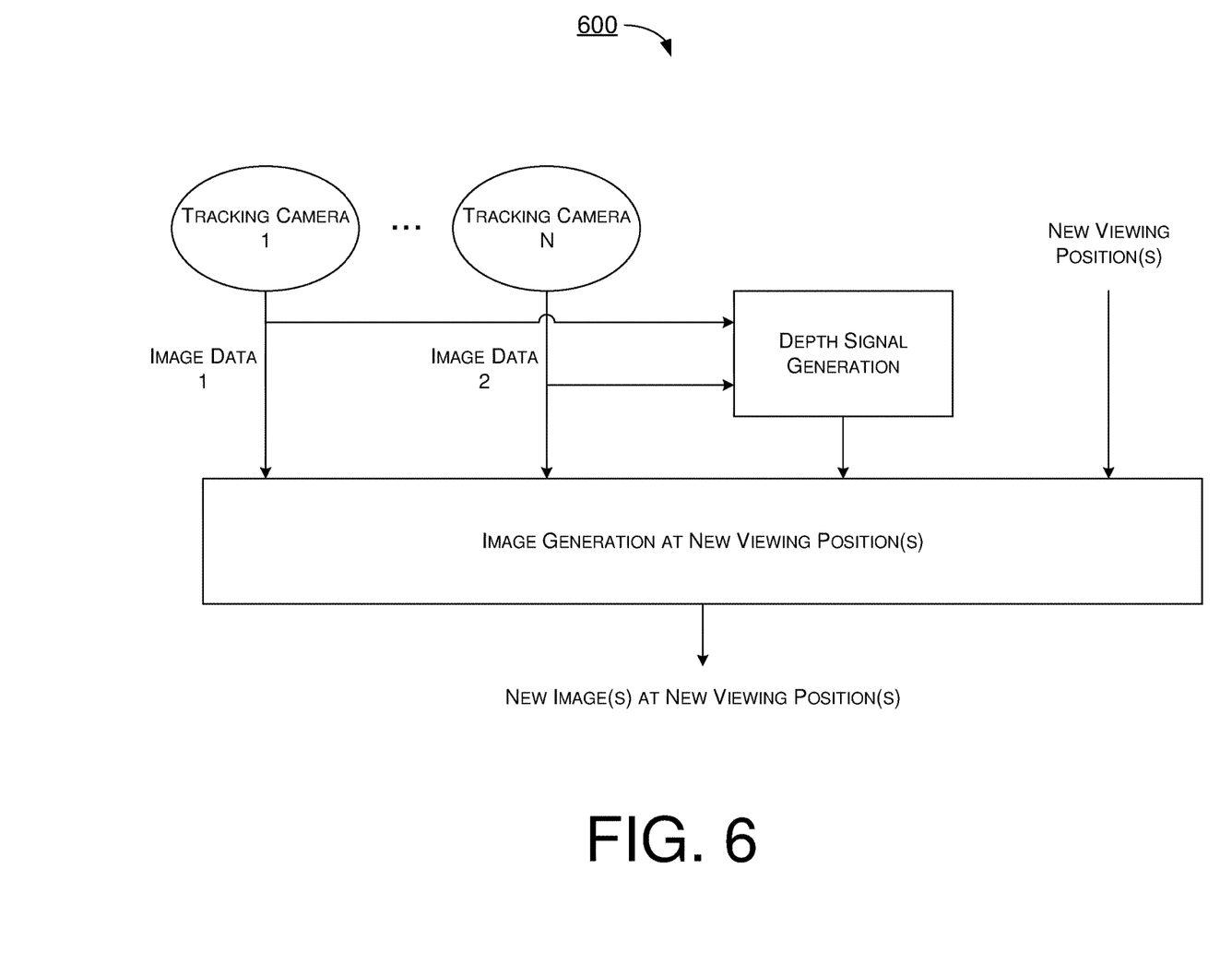
FIG. 6 is a diagram of an example scenario in accordance with an implementation of the present disclosure.

FIG. 6 illustrates an example scenario 600 of camera view synthesis in accordance with an implementation of the present disclosure. In scenario 600, each of a plurality of side or tracking cameras 1~N (with N being a positive integer greater than 1) may generate respective image data of a scene. For instance, a first side or tracking camera (denoted as "tracking camera 1" in FIG. 6) may generate first image data (denoted as "image data 1" in FIG. 6) and an $N^{th}$ side or tracking camera (denoted as "tracking camera N" in FIG. 6) may generate $N^{th}$ image data (denoted as "image data N" in FIG. 6). In scenario 600, depth signals may be generated using image data from side or tracking cameras 1~N to determine or otherwise obtain depth information with respect to the scene. The image data, depth information and a viewing position may be taken as input for image generation to generate image(s) of a see-through effect of viewing the scene from the viewing position via one or more see-through cameras. For instance, there may be a plurality of predefined viewing positions (e.g., for a frontal view, a top view and an angled/side view of the scene) each of which being a fixed position. In operation, one of the predefined viewing positions may be selected (e.g., by user or automatically chosen) as a new viewing position and, accordingly, view synthesis may be performed to create an effect of viewing the scene from the new viewing position via one or more see-through cameras.

Illustrative Implementations

Figure 7:
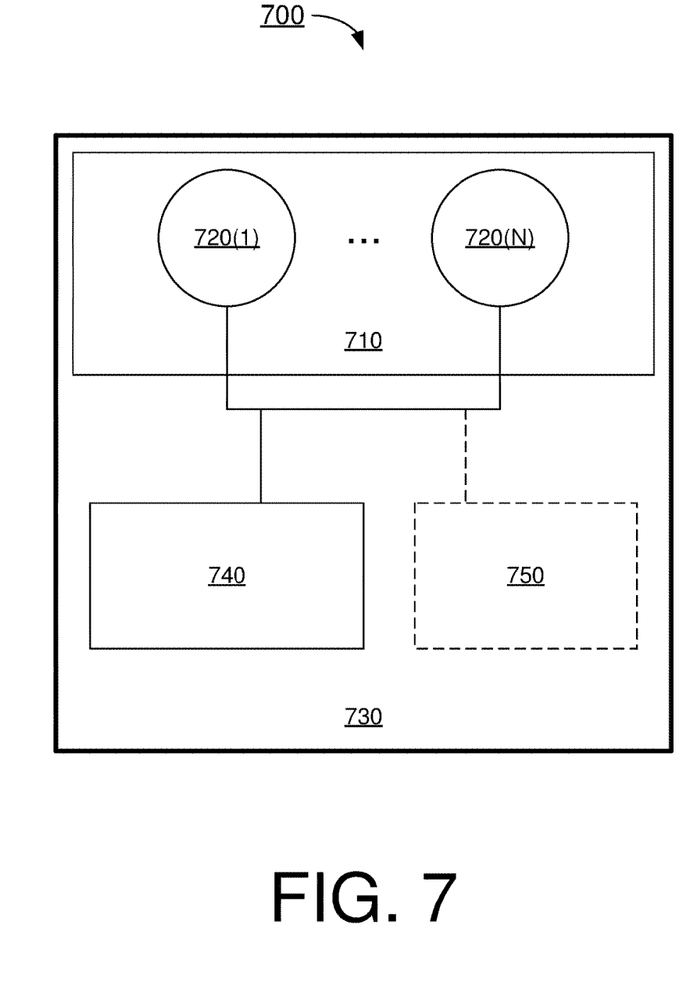
FIG. 7 is a block diagram of an example apparatus in accordance with an implementation of the present disclosure.
Figure 8:
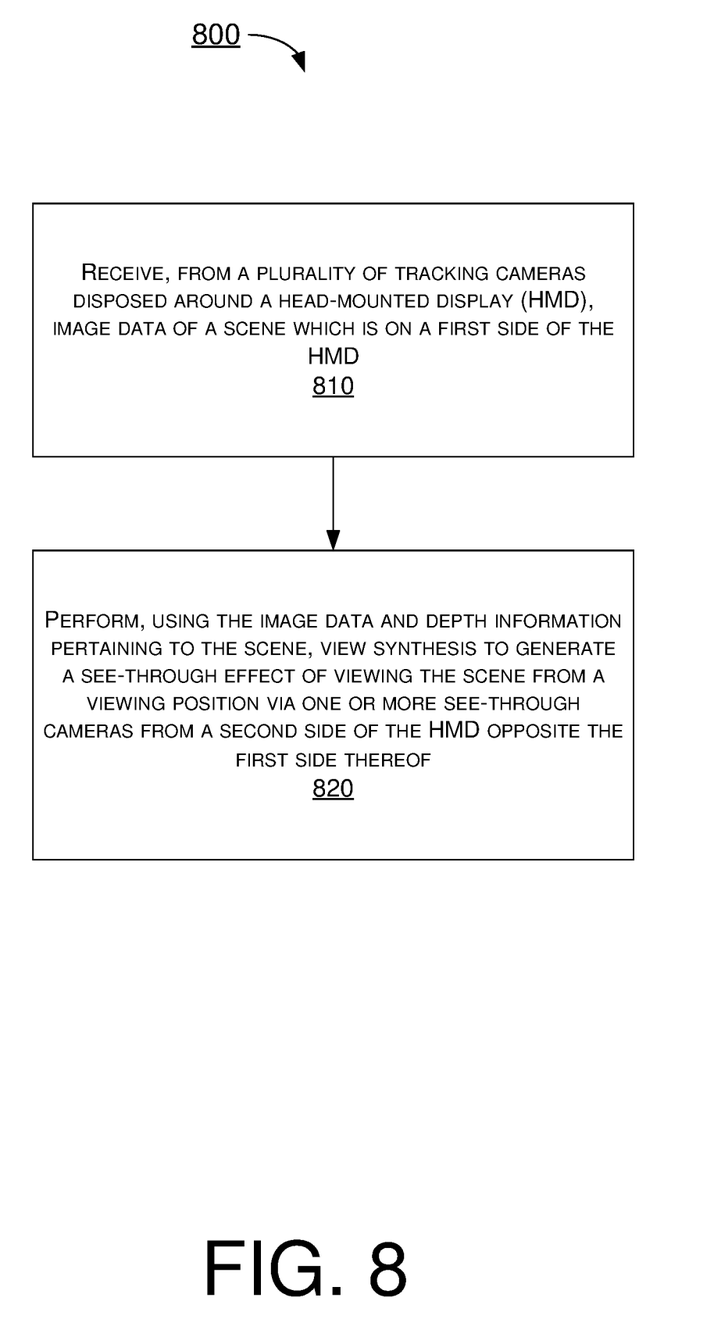
FIG. 8 is a flowchart of an example process in accordance with an implementation of the present disclosure.

FIG. 7 illustrates an example apparatus 700 in accordance with an implementation of the present disclosure. Apparatus 700 may perform various functions to implement schemes, techniques, processes and methods described herein pertaining to camera view synthesis for VR and AR, including the various schemes described above with respect to various proposed designs, concepts, schemes, systems and methods described above, including design 100, design 200, design 300, design 400, design 500, scenario 600 described above as well as process 800 described below. Moreover, apparatus 700 may be an example implementation of one or more of design 100, design 200, design 300, design 400, design 500 and scenario 600.

Apparatus 700 may include a HMD 730 and a processor 740. HMD 730 may include a head-mount piece 710 and a plurality of side or tracking cameras 720(1)~720(N) mounted or otherwise disposed around a profile of head-mount piece 710. Here, N may be a positive integer greater than 1. Apparatus 700 may also include a processor 740. Optionally, apparatus 700 may further include an image signal processor (ISP) 750 capable of receiving and processing image data from the plurality of side or tracking cameras 720(1)~720(N).

In some implementations, processor 740 may be implemented in the form of one or more integrated-circuit (IC) chips such as, for example and without limitation, one or more single-core processors, one or more multi-core processors, or one or more complex-instruction-set-computing (CISC) processors. Thus, even though a singular term "a processor" is used herein to refer to processor 740, processor 740 may include multiple processors in some implementations and a single processor in other implementations in accordance with the present disclosure. In another aspect, processor 740 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 740 may be a special-purpose machine specifically designed, arranged and configured to perform specific tasks including those pertaining to camera view synthesis for VR and AR in accordance with various implementations of the present disclosure.

Under a proposed scheme in accordance with the present disclosure, processor 740 or ISP 750 may receive, from side or tracking cameras 720(1)~720(N) disposed around head-mount piece 710 of HMD 730, image data of a scene which is on a first side (e.g., front side) of HMD 730. That is, the side or tracking cameras 720(1)~720(N) may be disposed on the first side of HMD 730 (e.g., on the front side and near the left side and/or right side of HMD 730) to capture images of the scene which is on the first side of HMD 730. Additionally, processor 740 may perform, using the image data and depth information pertaining to the scene, view synthesis to generate a see-through effect of viewing the scene from a viewing position on a second side (e.g., back side) of HMD 730 opposite the first side thereof.

In some implementations, in performing the view synthesis to generate the see-through effect of viewing the scene from the viewing position on the second side of the HMD, processor 740 may perform some operations. For instance, processor 740 may select one of a plurality of predefined viewing positions each of which being a fixed position. Additionally, processor 740 may synthesize viewing the scene from the selected one of the plurality of predefined viewing positions.

In some implementations, in performing the view synthesis to generate the see-through effect of viewing the scene on the second side of the HMD, processor 740 may generate an image of the scene with an effect of viewing the scene via one or more see-through cameras on the first side of HMD 730 and located corresponding to eyes of a user wearing HMD 730.

In some implementations, in performing the view synthesis to generate the see-through effect of viewing the scene on the second side of the HMD, processor 740 may synthesize viewing of the scene via one or more see-through cameras on the first side of HMD 730 by performing depth image-based rendering (DIBR) with hole filling.

In some implementations, side or tracking cameras 720 (1)~720(N) may include at least a first tracking camera 720(1) with a first frame rate (e.g., 120 fps) and a second tracking camera 720(N) with a second frame rate (e.g., 60 fps) different from the first frame rate. In such cases, in performing the view synthesis to generate the see-through effect of viewing the scene on the second side of the HMD, processor 740 may synthesize viewing of the scene via a single see-through camera on the first side of HMD 730 at a third frame rate (e.g., 10 fps or 20 fps) lower than the first frame rate and the second frame rate to achieve power saving.

In some implementations, side or tracking cameras 720(1)~720(N) may include at least a first tracking camera 720(1) with a first frame rate (e.g., 120 fps) and a second tracking camera 720(N) with a second frame rate (e.g., 60 fps) different from the first frame rate. In such cases, in performing the view synthesis to generate the see-through effect of viewing the scene on the second side of the HMD, processor 740 may synthesize viewing of the scene via a single see-through camera on the first side of HMD 730 at the first frame rate or the second frame rate.

In some implementations, side or tracking cameras 720(1)~720(N) may include at least a first tracking camera 720(1) with a first frame rate (e.g., 120 fps) and a second tracking camera 720(N) with a second frame rate (e.g., 60 fps) different from the first frame rate. In such cases, in performing the view synthesis to generate the see-through effect of viewing the scene on the second side of the HMD, processor 740 may synthesize viewing of the scene via a first see-through camera on the first side of HMD 730 at the first frame rate or the second frame rate and via a second see-through camera on the first side of HMD 730 at the first frame rate or the second frame rate.

In some implementations, side or tracking cameras 720(1)~720(N) may include at least a first tracking camera 720(1) with a first resolution and a second tracking camera 720(N) with a second resolution different from the first resolution. In such cases, in performing the view synthesis to generate the see-through effect of viewing the scene on the second side of the HMD, processor 740 may synthesize viewing of the scene via a single see-through camera on the first side of HMD 730 at the first resolution, the second resolution or a third resolution different from the first resolution and the second resolution.

In some implementations, side or tracking cameras 720(1)~720(N) may include at least a first tracking camera 720(1) with a first resolution and a second tracking camera 720(N) with a second resolution different from the first resolution. In such cases, in performing the view synthesis to generate the see-through effect of viewing the scene on the second side of the HMD, processor 740 may synthesize viewing of the scene via a first see-through camera on the first side of HMD 730 at the first resolution, the second resolution or a third resolution and via a second see-through camera on the first side of HMD 730 at the first resolution, the second resolution or the third resolution. Here, the third resolution may be different from the first resolution and the second resolution.

In some implementations, processor 740 may perform additional operations. For instance, processor 740 may generate depth signals using the image data from the plurality of tracking cameras. Moreover, processor 740 may determine the depth information based on the depth signals.

Illustrative Processes

FIG. 8 illustrates an example process 800 in accordance with an implementation of the present disclosure. Process 800 may represent an aspect of implementing various proposed designs, concepts, schemes, systems and methods described above, whether partially or entirely, including design 100, design 200, design 300, design 400, design 500 and scenario 600. More specifically, process 800 may represent an aspect of the proposed concepts and schemes pertaining to camera view synthesis for VR and AR. Process 800 may include one or more operations, actions, or functions as illustrated by one or more of blocks 810 and 820. Although illustrated as discrete blocks, various blocks of process 800 may be divided into additional blocks, combined into fewer blocks, or eliminated, depending on the desired implementation. Moreover, the blocks/sub-blocks of process 800 may be executed in the order shown in FIG. 8 or, alternatively in a different order. Furthermore, one or more of the blocks/sub-blocks of process 800 may be executed iteratively. Process 800 may be implemented by or in apparatus 700 as well as any variations thereof. Solely for illustrative purposes and without limiting the scope, process 800 is described below in the context of apparatus 700. Process 800 may begin at block 810.

At 810, process 800 may involve processor 740 of apparatus 700 or ISP 750 of apparatus 700 receiving, from side or tracking cameras 720(1)~720(N) disposed around head-mount piece 710 of HMD 730, image data of a scene which is on a first side (e.g., front side) of HMD 730. That is, the side or tracking cameras 720(1)~720(N) may be disposed on the first side of HMD 730 (e.g., on the front side and near the left side and/or right side of HMD 730) to capture images of the scene which is on the first side of HMD 730. Process 800 may proceed from 810 to 820.

At 820, process 800 may involve processor 740 performing, using the image data and depth information pertaining to the scene, view synthesis to generate a see-through effect of viewing the scene from a viewing position on a second side (e.g., back side) of HMD 730 opposite the first side thereof.

In some implementations, in performing the view synthesis to generate the see-through effect of viewing the scene from the viewing position on the second side of HMD 730, process 800 may involve processor 740 performing some operations. For instance, process 800 may involve processor 740 selecting one of a plurality of predefined viewing positions each of which being a fixed position. Additionally, process 800 may involve processor 740 synthesizing viewing the scene from the selected one of the plurality of predefined viewing positions.

In some implementations, in performing the view synthesis to generate the see-through effect of viewing the scene on the second side of HMD 730, process 800 may involve processor 740 generating an image of the scene with an effect of viewing the scene via one or more see-through cameras on the first side of HMD 730 and located corresponding to eyes of a user wearing HMD 730.

In some implementations, in performing the view synthesis to generate the see-through effect of viewing the scene on the second side of HMD 730, process 800 may involve processor 740 synthesizing viewing of the scene via one or more see-through cameras on the first side of HMD 730 by performing depth image-based rendering (DIBR) with hole filling.

In some implementations, side or tracking cameras 720(1)~720(N) may include at least a first tracking camera 720(1) with a first frame rate (e.g., 120 fps) and a second tracking camera 720(N) with a second frame rate (e.g., 60 fps) different from the first frame rate. In such cases, in performing the view synthesis to generate the see-through effect of viewing the on the second side of HMD 730, process 800 may involve processor 740 synthesizing viewing of the scene via a single see-through camera on the first side of HMD 730 at a third frame rate (e.g., 10 fps or 20 fps) lower than the first frame rate and the second frame rate to achieve power saving.

In some implementations, side or tracking cameras 720(1)~720(N) may include at least a first tracking camera 720(1) with a first frame rate (e.g., 120 fps) and a second tracking camera 720(N) with a second frame rate (e.g., 60 fps) different from the first frame rate. In such cases, in performing the view synthesis to generate the see-through effect of viewing the scene on the second side of HMD 730, process 800 may involve processor 740 synthesizing viewing of the scene via a single see-through camera on the first side of HMD 730 at the first frame rate or the second frame rate.

In some implementations, side or tracking cameras 720(1)~720(N) may include at least a first tracking camera 720(1) with a first frame rate (e.g., 120 fps) and a second tracking camera 720(N) with a second frame rate (e.g., 60 fps) different from the first frame rate. In such cases, in performing the view synthesis to generate the see-through effect of viewing the scene on the second side of HMD 730, process 800 may involve processor 740 synthesizing viewing of the scene via a first see-through camera on the first side of HMD 730 at the first frame rate or the second frame rate and via a second see-through camera on the first side of HMD 730 at the first frame rate or the second frame rate.

In some implementations, side or tracking cameras 720(1)~720(N) may include at least a first tracking camera 720(1) with a first resolution and a second tracking camera 720(N) with a second resolution different from the first resolution. In such cases, in performing the view synthesis to generate the see-through effect of viewing the scene on the second side of HMD 730, process 800 may involve processor 740 synthesizing viewing of the scene via a single see-through camera on the first side of HMD 730 at the first resolution, the second resolution or a third resolution different from the first resolution and the second resolution.

In some implementations, side or tracking cameras 720(1)~720(N) may include at least a first tracking camera 720(1) with a first resolution and a second tracking camera 720(N) with a second resolution different from the first resolution. In such cases, in performing the view synthesis to generate the see-through effect of viewing the scene on the second side of HMD 730, process 800 may involve processor 740 synthesizing viewing of the scene via a first see-through camera on the first side of HMD 730 at the first resolution, the second resolution or a third resolution and via a second see-through camera on the first side of HMD 730 at the first resolution, the second resolution or the third resolution. Here, the third resolution may be different from the first resolution and the second resolution.

In some implementations, process 800 may involve processor 740 performing additional operations. For instance, process 800 may involve processor 740 generating depth signals using the image data from the plurality of tracking cameras. Moreover, process 800 may involve processor 740 determining the depth information based on the depth signals.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    receiving, from a plurality of tracking cameras of a head-mounted display (HMD), image data of a scene from a plurality of first viewing positions, respectively, and
    performing, using the image data and a depth information pertaining to the scene, view synthesis to generate a see-through effect of viewing the scene from at least one second viewing position different from the plurality of first viewing positions, the at least one second viewing position being displaced along a face of the HMD from the plurality of first viewing positions,
    wherein the at least one second viewing position is more central to the HMD than the plurality of first viewing positions.

2. The method of claim 1, wherein the performing of the view synthesis to generate the see-through effect of viewing the scene further comprises:
    selecting one of a plurality of predefined viewing positions each of which is a fixed position; and
    synthesizing viewing the scene from the selected one of the plurality of predefined viewing positions.

3. The method of claim 1, wherein the performing of the view synthesis to generate the see-through effect of viewing the scene further comprises generating an image of the scene with an effect of viewing the scene via one or more see-through cameras located corresponding to eyes of a user wearing the HMD.

4. The method of claim 1, wherein the performing of the view synthesis to generate the see-through effect of viewing the scene further comprises synthesizing viewing of the scene via one or more see-through cameras by performing depth image-based rendering (DIBR) with hole filling.

5. The method of claim 1, further comprises:
    generating depth signals using the image data from the plurality of tracking cameras; and
    determining the depth information based on the depth signals.

6. The method of claim 1, wherein the plurality of tracking cameras comprises at least a first tracking camera with a first frame rate and a second tracking camera with a second frame rate different from the first frame rate.

7. The method of claim 6, wherein performing, using the image data and depth information pertaining to the scene, view synthesis to generate the see-through effect of viewing the scene from the at least one second viewing position generates images at the first frame rate, the second frame rate or a third frame rate.

8. The method of claim 1, wherein the plurality of tracking cameras comprises at least a first tracking camera with a first resolution and a second tracking camera with a second resolution different from the first resolution.

9. The method of claim 8, wherein performing, using the image data and depth information pertaining to the scene, view synthesis to generate the see-through effect of viewing the scene from the at least one second viewing position generates images at the first resolution, the second resolution or a third resolution.

10. An apparatus, comprising:
    a head-mounted display (HMD) comprising:
        a head-mount piece wearable by a user on a head of the user; and
        a plurality of tracking cameras disposed around the head-mount piece; and
    a processor which, during operation, performs operations comprising:
        receiving, from the plurality of tracking cameras, image data of a scene from a plurality of first viewing positions, respectively; and
        performing, using the image data and a depth information pertaining to the scene, view synthesis to generate a see-through effect of viewing the scene from at least one second viewing position different from the plurality of first viewing positions, the at least one second viewing position being displaced along a face of the HMD from the plurality of first viewing positions,
        wherein the at least one second viewing position is more central to the HMD than the plurality of first viewing positions.

11. The apparatus of claim 10, wherein, in performing the view synthesis to generate the see-through effect of viewing the scene, the processor further performs operations comprising:
    selecting one of a plurality of predefined viewing positions each of which is a fixed position; and
    synthesizing viewing the scene from the selected one of the plurality of predefined viewing positions.

12. The apparatus of claim 10, wherein, in performing the view synthesis to generate the see-through effect of viewing the scene, the processor further generates an image of the scene with an effect of viewing the scene via one or more see-through cameras located corresponding to eyes of a user wearing the HMD.

13. The apparatus of claim 10, wherein, in performing the view synthesis to generate the see-through effect of viewing the scene, the processor further synthesizes viewing of the scene via one or more see-through cameras by performing depth image-based rendering (DIBR) with hole filling.

14. The apparatus of claim 10, wherein, during operation, the processor further performs operations comprising:
    generating depth signals using the image data from the plurality of tracking cameras; and
    determining the depth information based on the depth signals.

15. The apparatus of claim 10, wherein the plurality of tracking cameras comprises at least a first tracking camera with a first frame rate and a second tracking camera with a second frame rate different from the first frame rate.

16. The apparatus of claim 15, wherein performing, using the image data and depth information pertaining to the scene, view synthesis to generate the see-through effect of viewing the scene from the at least one second viewing position generates images at the first frame rate, the second frame rate or a third frame rate.

17. The apparatus of claim 10, wherein the plurality of tracking cameras comprises at least a first tracking camera with a first resolution and a second tracking camera with a second resolution different from the first resolution.

18. The apparatus of claim 17, wherein performing, using the image data and depth information pertaining to the scene, view synthesis to generate the see-through effect of viewing the scene from the at least one second viewing position generates images at the first resolution, the second resolution or a third resolution.

\* \* \* \* \*